United States Patent [19]

Weatherford

[11] 3,862,904

[45] Jan. 28, 1975

[54] BOAT FOR COLLECTING OIL SLICKS AND OTHER CONTAMINANTS FROM THE SURFACE OF WATER

[76] Inventor: Danny J. Weatherford, 7250 North 41st. Ave., Phoenix, Ariz. 85021

[22] Filed: Jan. 21, 1974

[21] Appl. No.: 435,103

[52] U.S. Cl. ............................ 210/242, 210/DIG. 21
[51] Int. Cl. ............................................ E02b 15/04
[58] Field of Search ............... 210/83, 242, DIG. 21; 61/1 F

[56] References Cited
UNITED STATES PATENTS

| | | | |
|---|---|---|---|
| 3,142,281 | 7/1964 | Miller | 210/DIG. 21 |
| 3,539,048 | 11/1970 | Pearson | 210/DIG. 21 |
| 3,578,171 | 5/1971 | Usher | 210/DIG. 21 |
| 3,666,098 | 5/1972 | Garland | 210/DIG. 21 |
| 3,700,108 | 10/1972 | Richards | 210/DIG. 21 |
| 3,700,109 | 10/1972 | Lasko | 210/DIG. 21 |
| 3,715,034 | 2/1973 | Ivanoff | 210/242 |
| 3,748,264 | 7/1973 | McCombie | 210/DIG. 21 |
| 3,796,656 | 3/1974 | Avey | 210/DIG. 21 |

FOREIGN PATENTS OR APPLICATIONS

| | | | |
|---|---|---|---|
| 1,177,776 | 1/1970 | Great Britain | 210/DIG. 21 |
| 947,026 | 1/1964 | Great Britain | 210/242 |

*Primary Examiner*—Theodore A. Granger
*Attorney, Agent, or Firm*—Warren F. B. Lindsley

[57] ABSTRACT

A boat for collecting oil slicks and other contaminants from the surface of the water including boom means for drawing into the hull of the boat oil slicks and other contaminants which are processed and discharged to a floating appendage for storage purposes.

13 Claims, 7 Drawing Figures

3,862,904

BOAT FOR COLLECTING OIL SLICKS AND OTHER CONTAMINANTS FROM THE SURFACE OF WATER

BACKGROUND OF THE INVENTION

This patent application is an improvement over the structure claimed in a co-pending application, Ser. No. 321,281, filed Jan. 5, 1973 by the same inventor and entitled "Oil Slick Skimmer."

The importance of oil spill collecting apparatus has been brought sharply into focus recently by the energy crises coupled with increased public concern for the protection of the environment.

One of the significant effects of the population explosion and of the simultaneous industrialization and technological development of large areas of the world has been the rapid increase in the demand for energy in many forms. Because of the more widespread use of the automobile, central heating and refrigeration of homes, offices, factories and places of business, world fuel and energy consumption has grown even more rapidly than the population. These increased demands are compounded by the energy required for the industrial production of the associated consumer products. Because of the very rapid rate of growth in energy utilization in the face of the limited supply of conventional fuels, the nation and the world have suddenly reached the brink of an energy crisis.

While the various types of available energy sources are somewhat specialized in terms of applications, a shortage associated with one type of energy source is immediately reflected as an increased demand for other sources. Local demands for heating energy can alternately be supplied by coal, oil, natural gas or electricity. The availability of one such fuel or energy source controls the type of installation in new construction and may also necessitate conversion of existing equipment.

In the field of transportation, oil has been almost an exclusive energy source and the substitution of other fuels cannot quickly or readily be accomplished. While nuclear energy has become practical for the operation of ships and submarines, it cannot in the present state of the art be applied to aircraft, trains, trucks or automobiles. Natural gas has seen limited applications in this field, but supplies of this form of energy are also limited. The continued high level of oil usage as a fuel is thus expected to stand for some time.

Diminishing oil reserves in this country have led to increased oil imports from other parts of the world and to the development of off-shore oil fields. Huge seagoing tankers have been built to carry oil in significantly higher quantities than ever before, and extensive drilling operations are underway along out coastlines.

Both of these activities have unfortunately produced accidental oil spillages and the resulting contamination of waterways and shorelines points up a very serious problem: unless an effective means is developed to contain and collect the oil that is spilled in such accidents, environmental considerations may prevent the full utilization of these fuel sources.

The need to develop effective and practical apparatus for the collection of oil films from the water surface has thus become a matter of great importance.

1. Field of the Invention

This invention is directed toward the collection of oil and other contaminating films from the surface of the water without the use of additional applied chemicals, and to the provision of a versatile collection apparatus that is also capable of collecting other floating debris and can be used as well in other operations associated with oil transport and drilling operations such as the control of fires involving shipping or drilling equipment or spilled fuels.

2. Description of the Prior Art

Available methods and equipment for the collection of oil from the water surface are surprisingly primitive at the present time.

Procedures employed in the case of recent catastrophic oil spillages were essentially "make-shift" in character, having been devised on the spur of the moment to combat the immediate crisis. The English, for example, in the case of the Torrey Canyon spill, employed non-ionic detergents intended to emulsify the oil and hasten its evaporation or dispersion. The French, in connection with the same accident, used powdered chalk spread on the slick which was churned by small boats, hopefully causing the oil to mix with the chalk and sink to the bottom of the channel. Other materials such as sawdust and straw have been added to oil slicks to aid in the collection of the oil. Improvised vacuum cleaners have been used to collect oil or mixtures of oil and added materials from the surface of the water. Such methods have met with partial success but have proven inadequate to prevent very serious and extensive damage to beaches, coastal vegetation and sea life.

In a co-pending application the inventor has disclosed a barge with a hull appendage for skimming oil slicks from the water surface. The equipment disclosed has now been improved so that it is more effective in the collection of very thin films covering large surface areas and also provides an improved means for collecting other floating debris.

SUMMARY OF THE INVENTION

In accordance with the invention claimed, a new and improved oil collection craft is provided comprising a maneuverable, self-propelled barge equipped with a front-end surface skimmer to which surface films of oil or other contaminants are drawn by means of a floating boom in the form of a large loop or noose. This loop or noose, as it is drawn inwardly, confines the circumscribed film to an ever smaller area of increasingly heavy film until it is swept into the vessel at the skimmer aperture. A heavy wire mesh basket shields the skimmer aperture, collects floating debris, brush and other solid waste materials, and is lifted upwardly and emptied into a grinder and compressor apparatus which transforms such debris into compacted bales for subsequent disposal. The collected oil and other liquid contaminants are pumped into a floating storage bag which is towed behind the barge. Pumping equipment utilized for the pumping of oil to the storage bag also may be employed to pump water and other fire-fighting chemicals to water cannons and spraying ports for use in fighting fires.

It is, therefore, an object of this invention to provide an improved method and apparatus for the collection of oil slicks and other contaminants from the surface of the water.

Another object of this invention is to provide an improved oil collection apparatus which is capable of collecting films of surface oil which taking in with the collected oil film a very minimal amount of surface water.

A further object of this invention is to provide a surface oil collection apparatus with an additional capability to collect, grind and compact brush and other solid floating debris and to filter the water collected along with such debris before returning the water to its source.

A still further object of this invention is to provide such an apparatus with the additional capability of fighting fires associated with the oil transport or drilling operations.

A still further object of this invention is to provide along with the oil collection means an oil storage means in the form of a floating bag which is towed behind the collecting barge and into which the collected oil is pumped via a connecting hose.

A still further object of this invention is to provide such an improved surface film and debris collection apparatus in a compact and portable form which may be readily transported on a truck, train or sea-going vessel to the point of use.

A still further object of this invention is to provide an improved apparatus for filtering, cleaning and aerating water such as, for example, surface water of lakes, rivers and the like.

Further objects and advantages of the invention will become apparent as the following description proceeds and the features of novelty which characterize this invention will be pointed out with particularity in the claims annexed to and forming a part of this specification.

BRIEF DESCRIPTION OF THE DRAWINGS

The present invention may be more readily described by reference to the accompanying drawings, in which.

DESCRIPTION OF THE PREFERRED EMBODIMENT

Figures 1, 2:
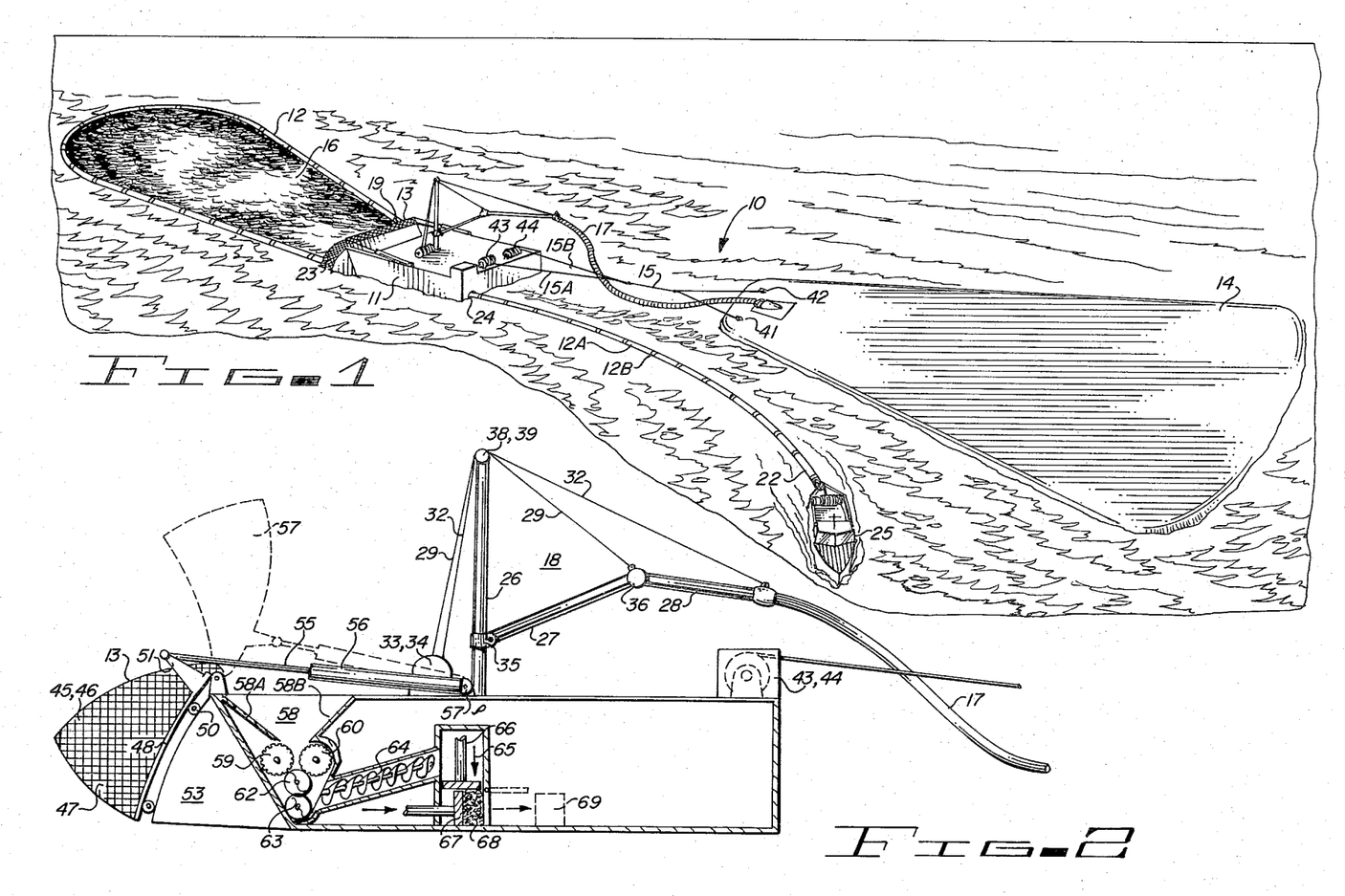
FIG. 1 is a perspective view of the oil collection apparatus embodying the invention.
FIG. 2 is a cross-sectional view of the skimmer barge showing details of those parts of the apparatus assoicated with the collection, handling and processing of solid debris.

Referring more particularly to the drawing by characters of reference, FIG. 1 discloses an improved oil collection apparatus 10 comprising a skimmer barge 11 which may be self-propelled, a surface floating oil collection boom 12, a debris basket 13, and an oil storage bag 14 which is towed behind barge 11 by means of a towing cable 15 and into which the collected surface oil 16 is pumped via delivery hose 17, hose 17 being supported by a pivoting boom 18 shown in FIG. 2. One end 19 of the floating oil collection boom 12 is attached at the front right-hand corner of barge 11; the other end 22 of boom 12 enters the front left-hand corner of barge 11 through aperture 23 and emerges at the rear left-hand corner of barge 11 through aperture 24, extending some distance outwardly from the rear of barge 11. It is drawn out of the way of the storage bag 14 by a small power boat 25.

Boom 12 comprises a floating string of hollow tubes 12A, preferably cylindrical and formed of aluminum, rubber coated nylon, fiberglass, reinforced plastic or combinations thereof. The tubes are closed at both ends and may be joined one to another by flexible fire-resistant collars 12B, which may be plastic, slipped over the ends of adjacent cylindrical tubes for holding them together. In operations requiring a heavy duty cable it may be desirable to add a rod and swivel coupling of some type between adjacent tubes.

The ensuing descriptions will disclose a motor and drive apparatus aboard barge 11 for drawing boom 12 through the apertures 23 and 24 of barge 11. Power boat 25 is utilized merely for keeping the boom away from storage bag 14 if this is necessary. Debris basket 13 mounted on the front end of barge 11 prevents a floating rubbish or other debris from entering the oil collecting compartment and is also employed to pick up such debris for processing and disposal.

The pivoting boom 18 which is shown in greater detail in FIG. 2 comprises a vertical support post 26, rigid hose support member 27 and 28, cables 29 and 32, boom winches 33 and 34, pivot joint 35 which joins member 27 to post 26, pivot joint 36 which joins member 28 to member 27, support bracket 37 at the rear termination of member 28, and pulleys 38 and 39 at the top of post 26 for the support of cables 29 and 32. Winches 33 and 34 draw in or let out cables 29 and 32, thereby raising or lowering pivot joint 36 and end support bracket 37, and thus control the elevation of delivery hose 17 as it leaves the rear of barge 11. Clearance thus provided between hose 17 and the highest protrusions at the rear of barge 11 allows barge 11 to be turned and other wise maneuvered without interference from delviery hose 17.

Towing cable which is open at both ends and joined at the center. The open end terminating at the storage bag attaches thereto at points 41 and 42. At the rear of barge 11 cable 15 separates into parts 15A and 15B which are secured and individually controlled by two cable winches 43 and 44, respectively. Winches 43 and 44 may be operated to alter the distance between barge 11 and storage bag 14 or they may be independently controlled to relieve tension in either line 15A and 15B as a maneuverability aid in difficult situations. An oil and water tight passage is provided inside the lower end of post 26, through joint 35, member 27, joint 36, member 28 and bracket 37 into hose 17 for the delivery of collected liquids to storage bag 14.

The debris basket 13 is made from heavy wire mesh which allows water and collected fluids to pass through but which retains floating solid debris such as brush and rubbish. Basket 13 is formed in the shape of a scoop having nearly pie-shaped side sections, 45 and 46, a substantially flat and rectangular but slightly curved bottom section 47 and a substantially flat and rectangular but slightly curved rear wall 48. The sides 45 and 46 are parallel to each other. The bottom section 47 and the rear wall 48 are substantially perpendicular to each other and they are substantially mutually perpendicular to the parallel sides 45 and 46.

During the skimming operation, debris basket 13 is in the lowered position shown in FIG. 1 and 2 in which its rests against bumpers 49 and 50 located at the leading edge of skimmer fin 52 and against identical bumpers located on identical skimmer fin 53 located opposite fin 52 at the right front corner of barge 11.

The top edge of basket 13 is pivotally connected to barge 11 at point 54. A connecting rod 55 is pivotally attached to a riser 51 affixed to basket 13 directly above pivot connection 54. The other end of rod 55 is connected to the piston of a pneumatic actuator 56.

Figure 3:
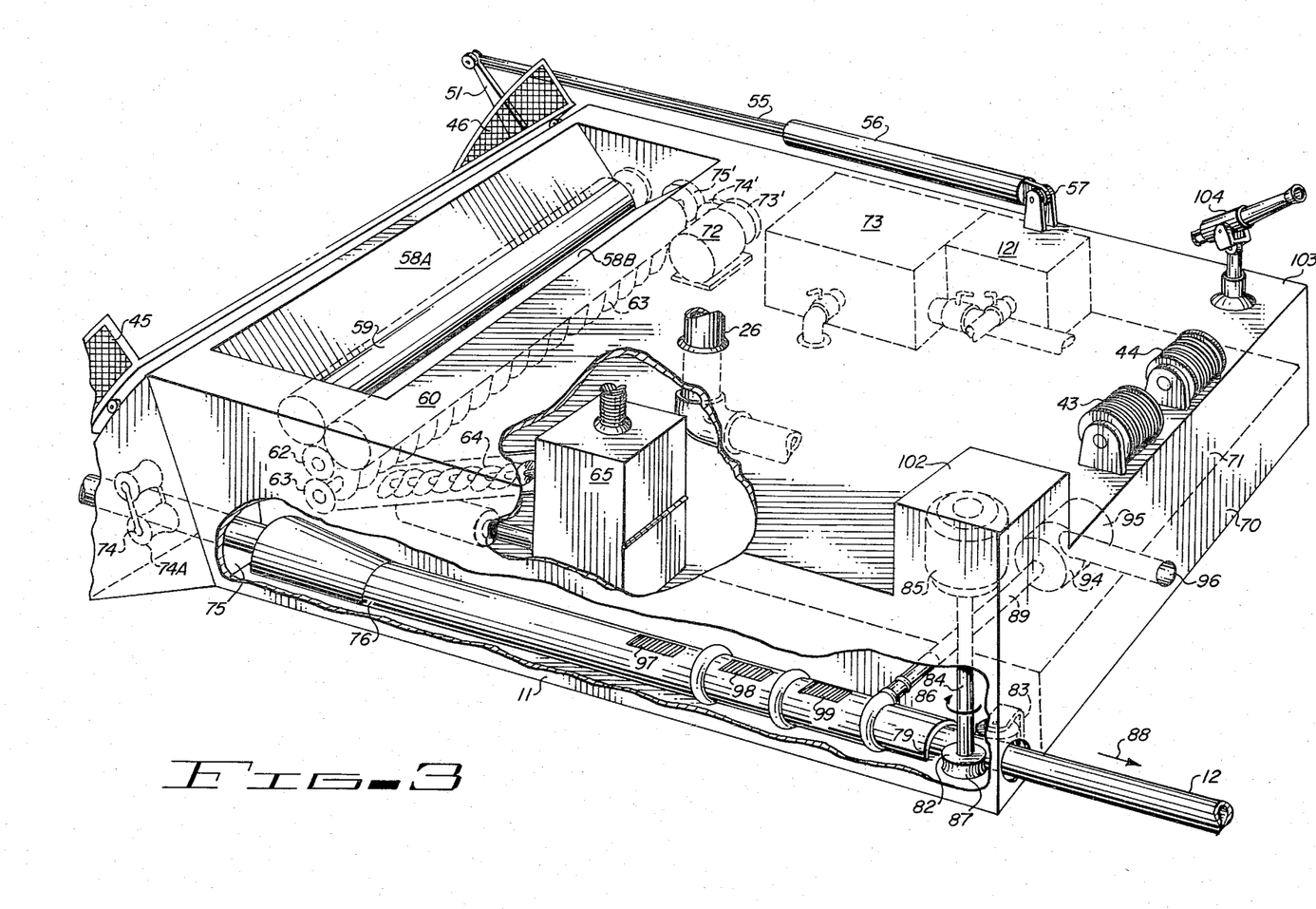
FIG. 3 is an enlarged perspective view of the skimmer barge with internal details displayed through cut-away sections and transparent representations of hull structures.

The closed end of the cylindrical housing of actuator 56 is pivotally connected at point 57 to the hull of barge 11. To raise basket 13, actuator 56 is operated, thereby causing rod 55 to be drawn into the cylindrical housing of actuator 56 and causing basket 13 to move upwardly about pivot 54 to the raised position indicated by the dash line image 57 of basket 13. In the preferred embodiment two actuators 56 are employed to raise basket 13, one located at each side of basket 13. When basket 13 reaches the elevated position of image 57, the collected debris falls from basket 13 into hopper 58. Hopper 58 as shown in FIGS. 2 and 3 has two sloping walls 58A and 58B which converge to a relatively narrow opening over two counter-rotating rollers 59 and 60. Rollers 59 and 60 have longitudinally grooved surfaces and are forced toward one another by heavy springs (not shown). A drive motor turns roller 59 in a clockwise direction while it turns roller 60 in a counterclockwise direction as viewed in FIG. 2 so that solid objects which become engaged therebetween are drawn through the aperture between rollers 59 and 60 just as clothing is drawn through the wringer of a washing machine. As the debris is drawn through rollers 59 and 60 it is driven against cutter wheel 62 which has cutting blades spirally arranged about its cylindrical form and which is also turned by a drive motor. As the debris is thus forced against cutter wheel 62 it is ground up into small particles by the planing action of cutter wheel 62 and is deposited into a lateral horizontal auger 63. Located at the delivery end of auger 63 is an elevator auger 64, which carries the debris particles into a compactor 65 where, by means of power actuated pistons 66 and 67, the debris particles 68 are compacted and ejected as a finished bale 69.

Additonal details involving the arrangement of apparatus and facilities aboard barge 11 are shown in FIG. 3. The hull of barge 11, as shown in FIG. 3, is divided into discrete vertical levels. The first or lower level comprises a water compartment which receives the surface water and oil or other contaminants by means of the skimmer aperture. The top surface or cover of the water compartment is the floor or deck 71 of the second level on which is mounted the supports for rollers 59 and 60, cutter 62, and augers 63 and 64. Also mounted on the same surface are the compactor 65 and drive motor 72 which is belt or chain coupled through drive pulleys 73, 74, 75 and 76 to rollers 59 and 60, cutter 62 and auger 63. To the rear of drive motor 72 and also mounted on the second level deck 71 is a chemical storage tank 73 which is employed for the storage of fire-fighting chemicals.

Also shown in FIG. 3 is the arrangement for the drive and handling means of boom 12 which enters barge 11 through a guide roller assembly 74 comprising two axially parallel rollers 74A and 74B, the one mounted above and the other below boom 12 in an arrangement intended to lower the elevation of the entering boom 12 from the water surface level to the level of the aperture 75 through which boom 12 enters cylindrical boom tube 76 which is slightly flared at its intake end 77 to accommodate vertical and horizontal deviations of boom 12. Boom tube 76 extends nearly to the rear of barge 11, terminating just short of exit aperture 78. Bearing against horizontally opposite surfaces of boom 12 as it passes between the termination 79 of boom tube 76 and aperture 78. are boom drive wheel 82 and boom idler wheel 83. Drive wheel 82 is driven by shaft 84 which is direct-coupled to boom drive motor 85 and it turned in the direction of arrow 86. Friction forces between drive wheel 82 and boom 12 are established by means of idler wheel 83 which is spring-loaded to produce perpendicular compression forces between drive and idler wheels and the boom surface. Vertical grooves 87 in the bearing surface of drive wheel 82 also enhance the frictional force required to draw in boom 12 and to move it in the direction indicated by arrow 88.

Just forward of termination 79 of boom tube 76 are three vanes or channels 91, 92 and 93 which encircle the cylindrical shell of boom tube 76 and which comprise surrounding channels equipped with inwardly opening ports. A pump 94 driven by a pump motor 95 receives at its intake port 96 relatively uncontaminated sea water and delivers it under pressure via water line 89 to vanes or collars 91, 92 and 93 from which it is discharged in the form of high-pressure, high-velocity jets through the aforementioned inwardly opening ports, the jets impinging upon the surface of boom 12 and thereby breaking loose and washing away the accumulated oil film from the surface of boom 12 and forcing it out into water compartment 70 through three sets of slotted apertures 97, 98 and 99 in boom tube 76. Aperture set 97 is located just ahead of vane 91, aperture set 98 is just ahead of vane 92 and aperture set 99 is just ahead of vane 93. Seals between successive aperture-vane pairs separate the three boom-washing operations which effectively clean the boom 12, thereby reducing its tendency to slip against the driving action of drive wheel 87 and also preventing contamination of clear water by boom 12 after its exits through aperture 78. Boom drive motor 85 is covered by boom motor housing 102.

FIG. 3 also illustrates the mounting of tow cable winches 43 and 44 on the upper or top deck 103 which also serves as the ceiling for the second level. At the rear corners of the top deck 103 are mounted water cannons 104, only one of which is shown, which are utilized in fire-fighting operations.

Figure 4:
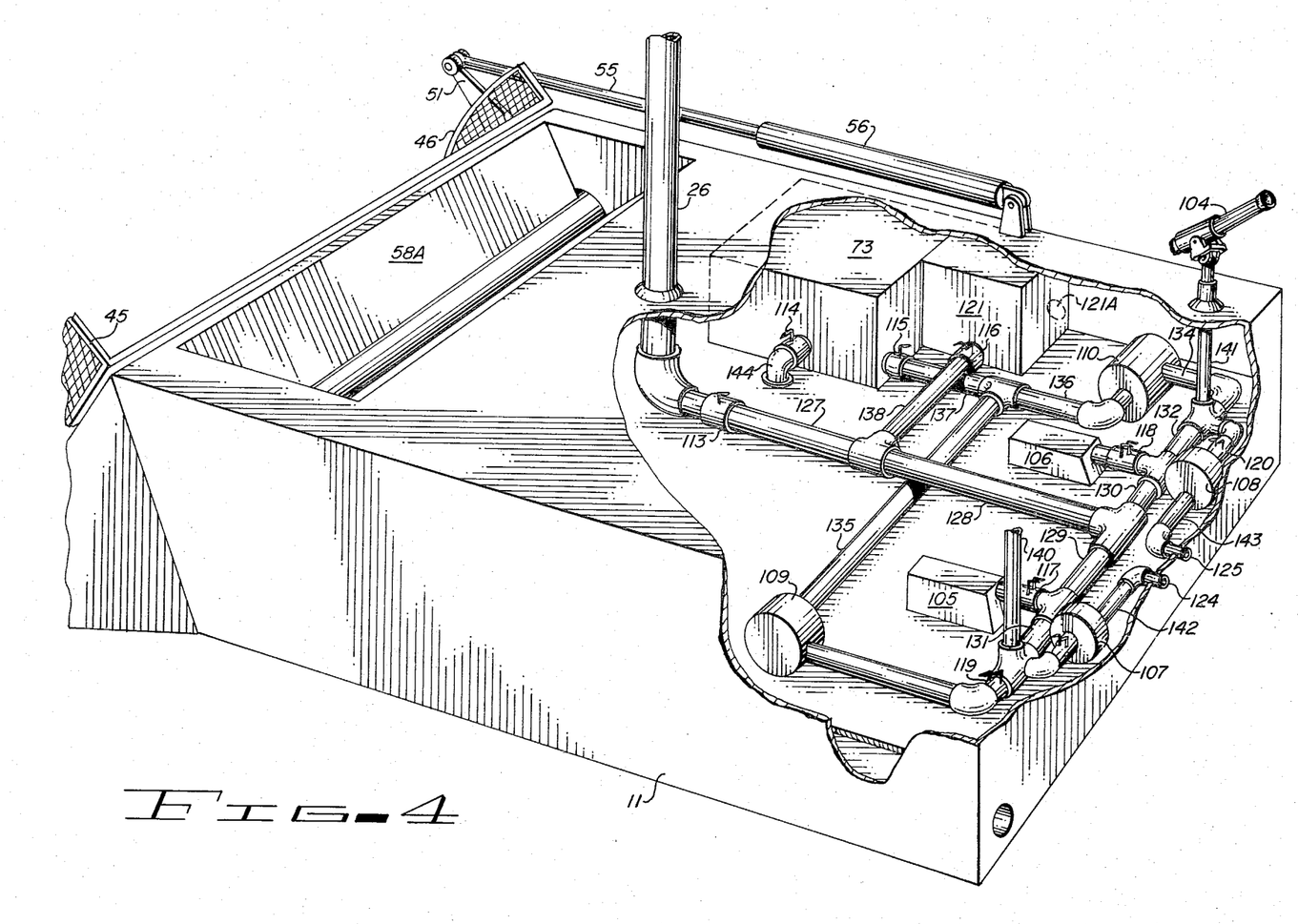
FIG. 4 is an enlarged perspective view of the skimmer barge showing only the pumping and other fluid handling equipment and delivery lines.

To handle the various liquids involved in the multifunctional operation of the oil collection barge 11, a system of pumps, valves, storage tanks and interconnecting plumbing is required as typified by the schematic representation shown in FIG. 4.

The fluid-handling system illustrated in FIG. 4 comprises jet pumps 105 and 106, chemical pumps 107, 108, 109 and 110, valves 113, chemical storage tank 73, a filter box 121 having an exhaust port 121A, chemical receiving headers 124 and 125, water cannon 104, fluid lines 127–144, and various fittings and couplings as illustrated which provide the desired couplings between pumps, valves, storage tanks, fluid lines, etc.

During the normal oil-skimming operation in which the collected oil and water mixture is pumped into the towed storage bag 14, valves 114, 115, 119 and 120 are closed, water cannons 104 which are mounted atop vertical water lines 140 and 141 are shut off, pumps 107, 108, 109 and 110 are inoperative, and jet pumps 105 and 106 pump the water and oil mixture from water compartment 70 through open valves 117 and 118, lines 129 and 130, line 128, line 127, open valve 113 into vertical post 26 and delivery cable 17 and into storage bag 14.

In a second operating mode in which barge 11 is employed to pick up debris and other contaminating materials where it is desired to add chemicals to the collected fluids and when filter the mixture and return the filtered water to the body of being cleared, valve 113 is closed, valve 116 is opened, valves 119 and 120 are closed, water cannons 104 are shut off, pumps 107, 108, 109 and 110 are inoperative, valve 114 is partially opened to allow a controlled amount of chemical additive to flow into water compartment 70, and the collected contaminated water with the added chemicals from tank 73 are pumped by jet pumps 105 and 106 through open valves 117 and 118, lines 129 and 130, lines 128, 138, open valve 116, filter box 121 and exhaust port 121A to the open sea or other body of water being cleared. The chemicals added to the collected debris in this mode of operation serve as catalysts which aid in the filtering process provided in filter box 121.

A number of different modes of fire-fighting operations are possible utilizing the apparatus shown in FIG. 4.

In the first fire-fighting mode, fresh water from compartment 70 is to be sprayed on the fire through water cannons 104. In this mode of operation valves 117 and 118 are open while all other valves are closed. All pumps are inoperative except jet pumps 105 and 106 which pump water from compartment 70 through valves 117 and 118, lines 131 and 132, lines 140 and 141 and water cannons 104, the water cannons being trained on the fire being brought under control.

In a second mode of operation, water is pumped from compartment 70 through water cannons 104 as in the first mode, but valve 114 is partially opened to add a desired amount of fire-fighting chemical to the water in compartment 70 prior to its being pumped to water cannons 104.

In a third fire-fighting mode in which it may be desired to pump undiluted fire-fighting chemicals from tank 73, all valves are closed except valve 115 and all pumps are inoperative except pumps 109 and 110 which now pump fire-fighting chemicals from tank 73 through valve 115 and line 137 to the junction of line 137 with lines 135 and 136 where the chemical divides in half, taking two parallel paths. The first path runs from line 137 through line 135, pump 109, line 133, line 140 and water cannon 104 (not shown) which is discharged in the direction of the fire, and the second path is from line 137 through line 136, pump 110, line 134, line 141 to cannon 104 which is also directed toward the fire being controlled.

In a fourth fire-fighting mode in which it is desired to utilize chemicals carried aboard another vessel which is cruising alongside barge 11, the fire-fighting chemicals are pumped from the other vessel via hoses connected from storage tanks aboard the other vessel into chemical receiving headers 124 and 125. For this pumping operation, chemical pumps 107 and 108 are operative and valves 119 and 120 are open, while all other pumps are inoperative and all other valves are closed. Pump 107 thus pumps chemicals through headers 124, line 142, open valve 119, line 140 to cannon 104 (not shown), while pump 108 pumps chemical from intake header 125 through line 143, open valve 120, line 141 to cannon 104 (shown). A variation of this mode is possible in which, in addition to the chemical pumping operations of pumps 107 and 108 just described, valves 117 and 118 are opened and jet pumps 105 and 106 are simultaneously operated to pump water from compartment 70 through valves 117 and 118 and lines 131 and 132, the water then mixing with the chemicals in lines 140 and 141 and being discharged together with the chemicals by water cannons 104.

In still another fire-fighting mode not illustrated in FIG. 4, it is possible with minor modifications of the plumbing hardware illustrated and with the addition of spray nozzles at appropriate locations on the front end of barge 11 to direct either water or chemicals or a mixture thereof in the direction of the oil film being drawn into the skimmer aperture. It is thus possible to utilize the fire-fighting capability of barge 11 in combination with the skimmer boom 12 to extinguish a fire that involves floating oil or other fuels. In this case the boom surrounds the flaming oil slick, drawing it into the skimmer aperture, while the discharged spray extinguishes the fire as it is drawn in, the barge 11 in this case literally swallowing the fire and at the same time preventing it from spreading further by virtue of the gathering action of boom 12. It should be recognized that the disclosed apparatus can be used with the water and chemical mix to fight fires on shore along the waterway or in hulls of ships with equal dispatch.

The efficiency of the skimming operation at the skimming aperture of barge 11 is dependent upon the maintenance of the proper water level on barge 11 and upon keeping the barge level in the water, both in terms of pitch and roll. All of these functions are provided through the control of ballast tanks 145–148 shown in FIGS. 5, 6 and 7.

Figure 6:
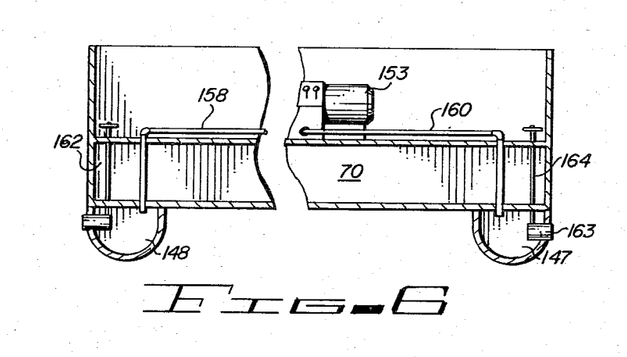
FIG. 6 is a cross-sectional view of the skimmer barge of FIGS. 2-5 taken along line 6—6 of FIG. 5.

The ballast tanks 145–148 are located under water compartment 70 running longitudinally along the two side edges of barge 11. The cross-section of the ballast tanks is approximately semi-circular as viewed from the front of barge 11, as shown in FIG. 6. As FIG. 7 indicates, tank 145 extends along the front half of the length of barge 11 on the right-hand side while tank 147 extends along the front half of the length of barge 11 on the left-hand side. Tank 146 extends along the rear half of the length of barge 11 on the right-hand side, and tank 148 extends along the rear half of the length of barge 11 on the left-hand side.

Figure 5:
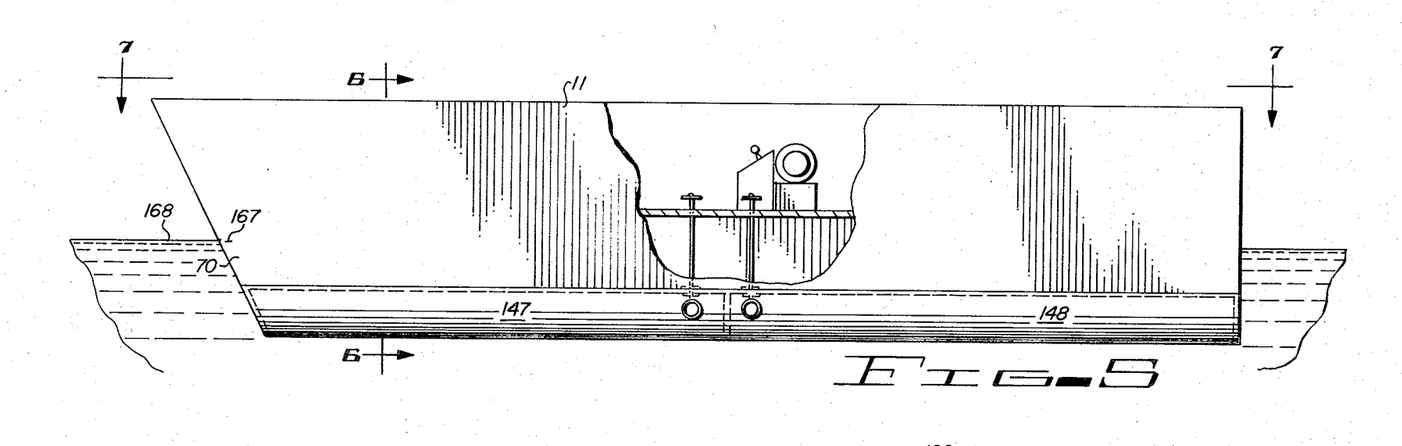
FIG. 5 is a side view of the hull structure of the skimmer barge with a cut-away section revealing the ballast compressor and associated control lines.
Figure 7:
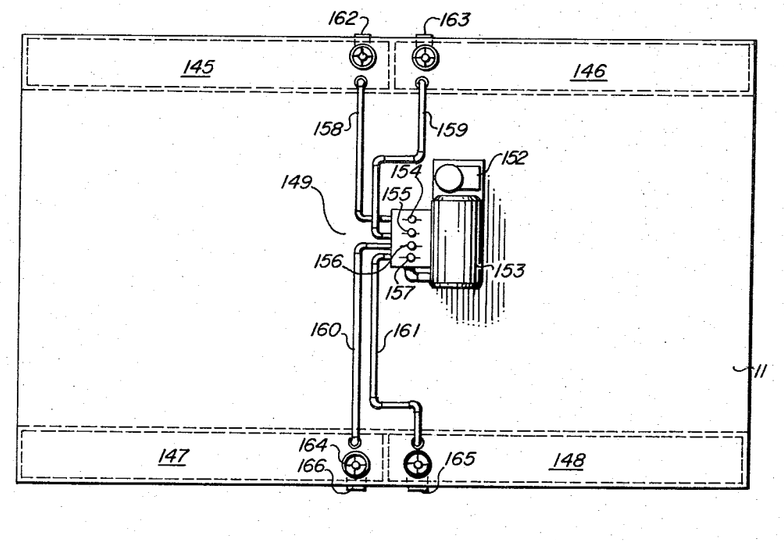
FIG. 7 is a top view of the skimmer barge of FIGS. 2-5 taken along line 7—7 of FIG. 5 and showing the ballast compressor and associated equipment located on the second deck of the skimmer barge.

As indicated earlier, the attitude of barge 11 in the water is controlled by selectively pumping air into the individual ballast tanks 145-148 or by allowing water to flow back into them. If, for example, it is desired to elevate the front right-hand corner of barge 11, air is pumped into tank 145; if it is desired to lower the front right-hand corner, water is permitted to flow into tank 145. The ballast control system 149 is employed for that purpose and it comprises compressor 152, compressor tank 153, compressor control valves 154–157, air lines 158–161, and flood valves 162–165.

As indicated in FIG. 7, each of the four tanks 145–148 communicates with one of the flood valves 162–165 and with one of the air lines 158–161, the air line being controlled by one of the four control valves 154–157.

Control of ballast tank 147 is typical of the other three and occurs in the following manner: with adequate pressure established in compressor tank 153 by the operation of compressor 152, compressor valve 156 and flood valve 164 are opened, allowing air from compressor tank 153 to flow through compressor valve 156 and line 160 into ballast tank 147, thereby forcing water out of tank 147 through valve opening 166 of flood valve 164. When the desired amount of water has been forced out of tank 147 as evidenced by the proper elevation of the left front corner of barge 11, the condition may be stabilized by closing flood valve 164. If it is desired to lower the front left corner of barge 11, water may be admitted to ballast tank 147 by turning compressor control valve to a reduced pressure setting and opening flood valve 164, which now allows water to flow from outside barge 11 into opening 166 of valve 164 with excess air from tank 147 flowing through line 160 and exhausting to the atmosphere through a bleeder orifice assoicated with valve 156.

One objective of the ballast control operation is to control the altitude of barge 11 in the water in such a way as to insure that it is level in terms of roll from left to right and also in terms of pitch from fore to aft; a second objective is to control the elevation of barge 11 in the water so as to insure under skimming operations that the level of skimming aperture 167 is slightly lower than the water level 168.

The first objective is achieved by adjusting the amount of water in the front tanks 145 and 147 relative to the amount in rear tanks 146 and 148 or by adjusting the amount of water in the left-hand tanks 147 and 148 relative to the amount in the right-hand tanks 145 and 146. The second objective is achieved by simultaneously adjusting the amount of water in all four ballast tanks, 145–148. When a proper adjustment is achieved the oil film or other contaminant with a very minimal amount of top water will flow over the edge of an aperture or sluice gate 167 into water compartment 70 as boom 12 is drawn into barge 11. The sluice gate may be of any suitable configuration such as shown in copending U.S. application Ser. No. 329,281. With proper control of jet pumps 105 and 106 a constant amount of water is maintained in compartment 70. Without such proper control, changes in the amount of water contained in compartment 70 would alter the elevation of barge 11. Such control is most readily achieved when compartment 70 is maintained in a nearly full condition so that the rate of flow into compartment 70 is determined by the rate of water flow into compartment 70 is determined by the rate of water pumped out of compartment 70 by jet pumps 105 and 106.

While the primary purpose of the apparatus described is to collect surface films of oil or other contaminants, the versatility of barge 11 which renders it useful for other essential tasks enhances its economic practicability. As described earlier, the barge may be used as well to clear floating solid rubbish from the water surface with an additional capability to shred and compact the debris into disposable bales. If the surface contaminant is in the form of fine particles or if it is semi-solid in nature, the barge has been shown capable of treating the surface water and such contaminating materials chemically and then filtering the contaminants from the water before returning the water in an aerated condition to its source. Finally, the barge has been shown to be useful in the fighting of fires occuring on the water surface or on other crafts or equipment and a number of fire-fighting modes involving water and chemical fire-fighting sprays were described.

An especially versatile system is thus provided in fulfillment of the objects of the invention.

Although but one embodiment of the present invention has been illustrated and described, it will be apparent to those skilled in the art that various changes and modifications may be made therein without departing from the spirit of the invention or from the scope of the appended claims.

I claim:

1. A boat for collecting oil slicks and other contaminants from the surface of the water comprising:
   a hull having a bow and a stern,
   a fluid receiving compartment arranged in the bottom of said hull,
   a sluice gate formed in the bow of the boat for selectively admitting surface water only into said receiving compartment,
   an oil collecting boom comprising a plurality of elongated flexible interconnected members floatable on water.
   said boom being connected at one end to one side of said bow on one side of said sluice gate and having its other end fed through an aperture in the hull of the boat on the other side of said sluice gate, said apertures being arranged longitudinally of said hull,
   means for moving said boom through the apertures in said hull to cause the surface of the water within the loop formed by said boom to be moved into said sluice gate and said fluid receiving compartment, and
   pump means connected to said compartment for removing fluid therefrom.

2. The boat for collecting oil slicks and other contaminants set forth in claim 1 wherein:
   said boom comprises a plurality of interconnected hollow cylindrical tubes interconnected at their ends.

3. The boat for collecting oil slicks and other contaminants set forth in claim 2 wherein:
   said boom comprises hollow metallic cylindrical tubes interconnected at their ends.

4. The boat for collecting oil slicks and other contaminants set forth in claim 2 wherein:
   said boom comprises hollow fiberglass tubes interconnected at their ends.

5. The boat for collecting oil slicks and other contaminants set forth in claim 1 in further combination with:
   a debris basket upwardly formed of wire mesh pivotally mounted on said bow of the boat for collecting contaminants, and means for rotating said basket to dump contaminants into a compartment of said hull.

6. The boat for collecting oil slicks and other contaminants set forth in claim 5 in further combination with:

means mounted in said hull for receiving said debris and other contaminants and processing the same for removal from said hull.

7. The boat for collecting oil slicks and other contaminants set forth in claim 6 wherein:

said means for receiving said debris and other contaminants comprises a hopper, means for cutting and crushing said debris and other contaminants into smaller particles, and means for packaging the same for ease in handling.

8. The boat for collecting oil slicks and other contaminants set forth in claim 7 wherein:

said means for cutting and crushing comprises a pair of rollers for receiving between them the debris and other contaminants, and said means for packaging comprises a bailer.

9. The boat for collecting oil slicks and other contaminants set forth in claim 1 in further combination with:

said aperture comprising a hollow tube having a funnel-shaped opening in said bow of said hull and extending longitudinally of said hull for receiving and guiding said boom through said hull.

10. The boat for collecting oil slicks and other contaminants set forth in claim 9 wherein:

said tube is provided with at least one hollow collar arranged around its periphery, said hollow collar providing a fluid passage which opens into said tube around its periphery, means for forcing water under pressure into said tube around its periphery for cleaning it of clinging oil droplets, and at least one outlet port arranged around said tube connecting the hollow interior of said tube with said fluid receiving compartment.

11. The boat for collecting debris and other contaminants set forth in claim 1 in further combination with:

a storage bag connected to said pump means and connected to the stern of said hull.

conduit means conducting fluid from an outlet end of said pump to an inlet into said bag in communication with the interior thereof for receiving fluid from said fluid receiving compartment.

12. The boat for collecting debris and other contaminants set forth in claim 1 in further combination with:

a chemical tank mounted in said hull, and conduit means interconnecting said chemical tank and said pump and conducting fluid from an outlet end of said pump to an inlet into said fluid receiving compartment for selectively pumping chemicals into said fluid receiving compartment.

13. The boat for collecting debris and other contaminants set forth in claim 12 in further combination with:

at least one water cannon mounted on said hull, second conduit means interconnecting said water cannon and said pump and conducting fluid from an outlet end of said pump to an inlet of said cannons whereby said pump can selectively conduct chemicals from said chemical tank to said cannon, and third conduit means interconnecting said fluid receiving compartment to an inlet of said pump whereby said pump can selectively conduct fluid from said fluid receiving compartment to said cannon.

* * * * *